US008278240B2

(12) United States Patent
Tange et al.

(10) Patent No.: US 8,278,240 B2
(45) Date of Patent: Oct. 2, 2012

(54) METHOD OF PRODUCTION OF TRANSITION METAL NANOPARTICLES

(75) Inventors: Kyoichi Tange, Susono (JP); Alexander Talyzin, Umea (SE); Fanny Barde, Zarenten (BE)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 316 days.

(21) Appl. No.: 12/596,935

(22) PCT Filed: Feb. 28, 2008

(86) PCT No.: PCT/JP2008/054098
§ 371 (c)(1),
(2), (4) Date: Feb. 12, 2010

(87) PCT Pub. No.: WO2008/132881
PCT Pub. Date: Nov. 6, 2008

(65) Prior Publication Data
US 2010/0152041 A1    Jun. 17, 2010

(30) Foreign Application Priority Data
Apr. 24, 2007 (JP) ................. 2007-114392

(51) Int. Cl.
| B01J 31/00 | (2006.01) |
| B01J 21/18 | (2006.01) |
| B01J 23/00 | (2006.01) |
| B01J 23/40 | (2006.01) |
| B01J 23/74 | (2006.01) |
| B01J 23/72 | (2006.01) |
| B01J 23/56 | (2006.01) |
| B01J 23/44 | (2006.01) |
| B01J 23/42 | (2006.01) |
| B01J 20/02 | (2006.01) |

(52) U.S. Cl. ........ 502/167; 502/184; 502/185; 502/331; 502/332; 502/333; 502/334; 502/335; 502/337; 502/339; 502/406; 977/773; 977/775; 977/810

(58) Field of Classification Search ................. 502/184, 502/185, 331–335, 337, 339, 406, 167; 977/773, 977/775, 810
See application file for complete search history.

(56) References Cited

U.S. PATENT DOCUMENTS
3,978,001 A * 8/1976 Meyer ........................ 502/235
(Continued)

FOREIGN PATENT DOCUMENTS
JP     11-157835     6/1999
(Continued)

OTHER PUBLICATIONS
"Synthesis and characteristics of NiO nanoparticles by thermal decomposition of nickel dimethylglyoximate rods," Xueliang Li et al. Solid State Communications 137 (2006), pp. 581-584.*
(Continued)

Primary Examiner — Patricia L Hailey
(74) Attorney, Agent, or Firm — Finnegan, Henderson, Farabow, Garrett & Dunner, LLP

(57) ABSTRACT

There is provided a method of stably producing nanoparticles of a metal alone, in particular a transition metal alone, the method comprises heating a chelate complex (M-DMG) comprised of two dimethyl glyoxime (DMG) molecules and one transition metal (M) ion at 300 to 400° C. so as to generate transition metal (M) nanoparticles carried on carbon particles. The method preferably comprises heating a mixture of said chelate complex (M-DMG) and alumina so as to generate transition metal (M) nanoparticles carried on alumina. Preferably, the transition metal (M) is one of Ni, Cu, Pd, and Pt. Typically, the generated transition metal (M) nanoparticles have a size of a diameter of 5 to 15 nm.

6 Claims, 3 Drawing Sheets

U.S. PATENT DOCUMENTS

| | | | |
|---|---|---|---|
| 4,302,597 A | * 11/1981 | Manara et al. | 564/127 |
| 4,625,063 A | * 11/1986 | Yokota et al. | 564/480 |
| 2003/0104936 A1 | 6/2003 | Mao et al. | |

FOREIGN PATENT DOCUMENTS

| JP | 2001-192712 | 7/2001 |
|---|---|---|
| JP | 2004-168641 | 6/2004 |
| WO | WO 03/061827 A2 | 7/2003 |

OTHER PUBLICATIONS

X. Ni et al., "Synthesis of Nickel Nanocrystallites with Hexagonal Flake-like Morphology from Nickel Dimethylglyoximate," Chemistry Letters, vol. 33, No. 12, pp. 1564-1565 (2004).

* cited by examiner

Fig.1
(1)
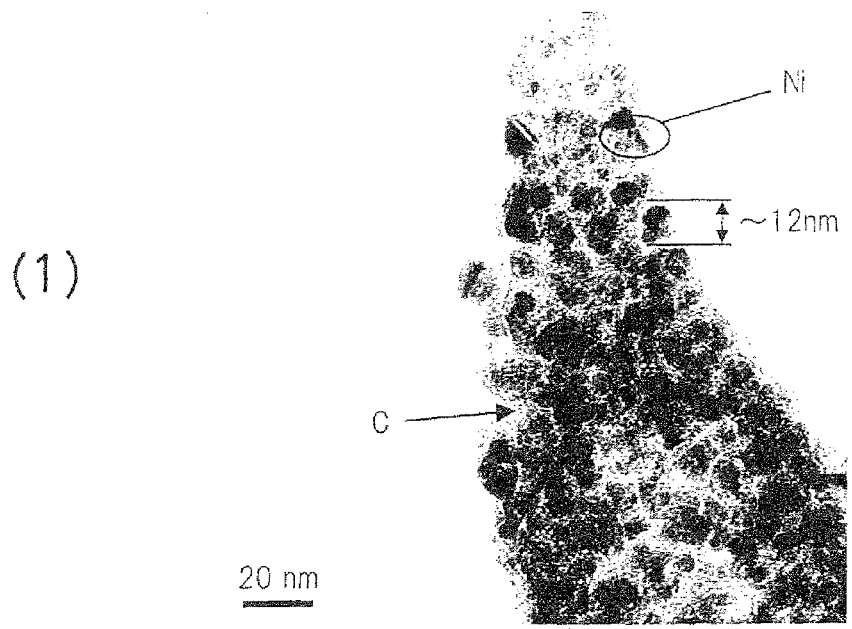
(2)
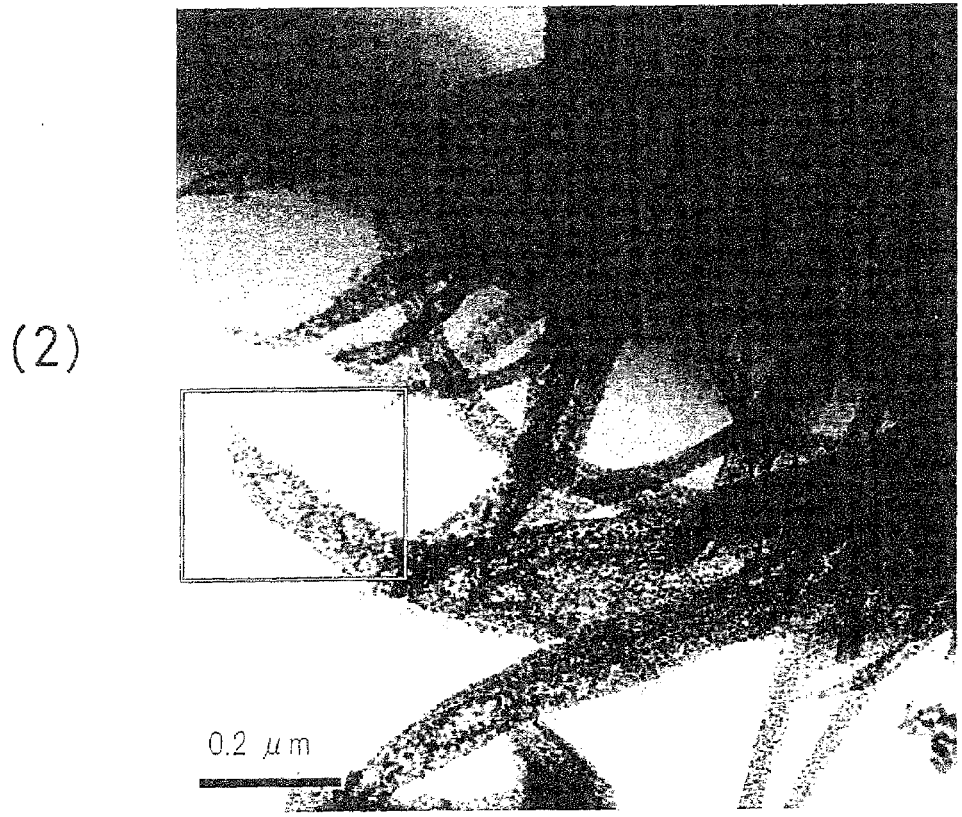

METHOD OF PRODUCTION OF TRANSITION METAL NANOPARTICLES

CROSS-REFERENCE TO RELATED APPLICATIONS

This application is a national phase application of International Application No. PCT/JP2008/054098, filed Feb. 28, 2008, and claims the priority of Japanese Application No. 2007-114392, filed Apr. 24, 2007, the contents of both of which are incorporated herein by reference.

TECHNICAL FIELD

The present invention relates to a method of production of metal nanoparticles, more particularly a method of production of transition metal nanoparticles.

BACKGROUND ART

"Metal nanoparticles" are typically fine particles of a sole metal of a diameter of 5 to 15 nm or so. Compared with the conventional particles of diameters of the order of several μm or more, they have an overwhelmingly larger specific surface area and thereby an extremely large activity, so are promising for diverse applications such as a material for storage of hydrogen or other gases. In particular, transition metal nanoparticles are promising for diverse areas due to their high chemical activity.

However, for example, as proposed in Japanese Patent Publication (A) No. 2004-168641, various ways are known for producing nanoparticles of metal oxides, but metals, in particular transition metals, alone have an extremely high chemical and physical activity, so end up easily forming compounds or aggregates. It was extremely difficult to stably produce nanoparticles.

DISCLOSURE OF THE INVENTION

The present invention has as its object the provision of a method for stably producing nanoparticles of a metal alone, in particular a transition metal alone.

Means for Solving the Problem

To achieve the above object, the present invention provides a method of production of transition metal nanoparticles characterized by heating a chelate complex comprised of two dimethyl glyoxime molecules and one transition metal ion at 300 to 400° C. so as to generate transition metal nanoparticles carried on carbon particles.

If heating a chelate complex (M-DMG) comprising two dimethyl glyoxime (DMG) molecules and one transition metal (M) ion at a temperature of a prescribed range, nanoparticles of the metal M along released from the M-DMG are obtained in a state stably carried on the particles of C similarly released.

BRIEF DESCRIPTION OF THE DRAWINGS

FIG. 1 shows TEM photographs of Ni nanoparticles generated in a state carried on amorphous carbon by the present invention using Ni-DMG alone as a starting material. (1) is a high magnification photograph of an area surrounded by the square in the field of (2).

BEST MODE FOR CARRYING OUT THE INVENTION

Figure 2:
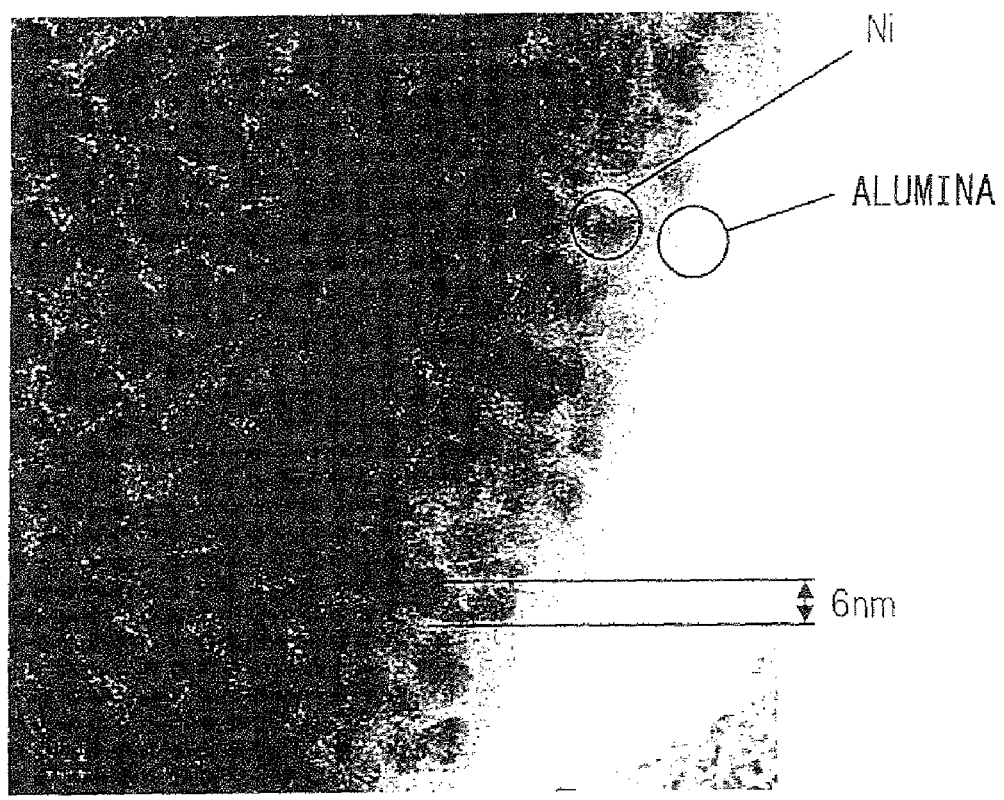
FIG. 2 shows a TEM photograph of Ni nanoparticles generated in a state carried on alumina by the present invention using a mixture of Ni-DMG and alumina as a starting material.

In the present invention, the chelate complex (M-DMG) comprised of two dimethyl glyoxime (DMG) molecules and one transition metal (M) ion as a starting material has the structure of the following formula 1.

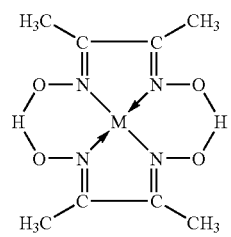

By heating M-DMG in the temperature range of 300 to 400° C., nanoparticles of the metal M alone released by the decomposition of the M-DMG are generated in a state carried on C alone. If the heating temperature is less than 300° C., the above reaction will not occur, while conversely if the heating temperature is over 400° C., the generated particles will remarkably agglomerate and nanoparticles will not be able to be obtained. Here, the reason why the metal M and the carbon C are generated in an independent state without oxidation is believed to be that the H released due to decomposition of the M-DMG forms a reducing atmosphere.

According to a preferred embodiment of the present invention, by heating a mixture of the chelate complex M-DMG and alumina at the temperature of the prescribed range, nanoparticles of the metal M alone with a higher specific surface area are obtained in the state carried on alumina particles.

According to a preferred embodiment of the present invention, the transition metal M of the chelate complex M-DMG is any of Ni, Cu, Pd, or Pt.

The transition metal nanoparticles generated by the method of the present invention have a size of typically a diameter of 5 to 15 nm.

EXAMPLES

Example 1

A preferable embodiment of the present invention heats a chelate complex Ni-DMG comprised of a transition metal M comprised of Ni and two dimethyl glyoxime (DMG) molecules and Ni at 350° C. and generates Ni nanoparticles carried on carbon particles. The routine and conditions are as shown below.

3 grams of Ni-DMG (commercial product: 99% Strem Chemicals/Aldrich ref 13478-93-8) were weighed. Ni-DMG is a powder of particle size of several 10 μm to 100 μm.

A Pyrex® glass tube with one closed end and one open end (length 30 cm, outside diameter 10 mm, inside diameter 8 mm) was packed with said weighed reagent at its closed end. To ensure uniform temperature of the sample part, this was covered by aluminum foil.

The tube was placed in an electric furnace, heated so that the sample part became 350° C., and held there for 4 hours. During the heating and holding operation, the open end of the glass tube was left open to the atmosphere.

After this, the electric furnace was turned off. After 30 minutes, the glass tube (about 200° C.) was pulled out and the product was taken out.

The product was comprised of amorphous carbon carrying Ni nanoparticles.

FIG. 1 shows a TEM (transmission electron microscope) photograph. The product, as shown in FIG. 1(2), is an assembly of long, thin fibers. A photograph enlarging part of that (area surrounded by square of FIG. 1(2)) is given in FIG. 1(1). The bright gray parts (C) show amorphous carbon particles, while the black parts (Ni) show Ni nanoparticles. The particles have a size, in the example shown in the photograph, of about 12 nm and are overall 10 to 15 nm.

As a result of analysis by EDX (energy dispersion type X-ray analysis) and TGA (thermal gravimetric analysis), the product as a whole had a composition of, at at %, 70% Ni-24% C-6% N.

The specific surface area was 47 $m^2/g$ (measured by "Autosorb" made by Quantachrome).

The hydrogen storage amount at room temperature and 300 MPa was 0.13 mass % (measured by PCT system of Suzuki Shokan PCT. The standard was the total mass of the measurement sample.)

Example 2

According to a more preferable embodiment of the present invention, a mixture of the chelate complex Ni-DMG and alumina of Example 1 was heated to 350° C. to generate Ni nanoparticles carried on alumina particles. The routine and conditions are as shown below.

1 gram of alumina whiskers (commercial product: Sigma Aldrich ref. 551-643) was weighed. This was packed together with four alumina balls in a balling mill container, then 2 g of said Ni-DMG was added. The result was milled at a rotational speed of 350 rpm for 30 minutes.

The obtained mixed powder was heated by the same routine and conditions as in Example 1.

The product was generated in the state with the Ni nanoparticles carried on the alumina whiskers.

FIG. 2 shows a TEM photograph. The bright gray parts indicate alumina, while the black parts indicate Ni nanoparticles. The particles had a size of 6 nm in the example shown in the photograph and were overall 5 to 10 nm.

As a result of analysis by EDX and TGA, the product as a whole had a composition of, at at %, 67% Ni-7% Al-3% O-16% C-7% Si. Si was due to some sort of contamination.

The same procedure was followed as in Example 1 to measure the characteristics. As a result, the specific surface area was 207 $m^2/g$ and the hydrogen storage amount (room temperature and 300 MPa) was 0.33 mass %.

Compared with Example 1, due to the addition of alumina, the specific surface area was increased 4.4-fold and the hydrogen storage amount was increased 2.5-fold.

<Effects of Heating Temperature>

Ni-DMG/alumina mixed powder the same as Example 2 was used and heat treated while changing the heating temperature in various was in the range of 250 to 450° C. The change in specific surface area of the product obtained with respect to the heating temperature is shown in FIG. 3.

As shown in the figure, when heating in the temperature range of the present invention, that is, 300 to 400° C., a remarkable increase in the specific surface area was recognized. As explained above, with heating at a temperature lower than 300° C., the expected reaction does not occur, while with heating at a temperature higher than 400° C., there was remarkable aggregation of particles. In both cases, the desired nanoparticles could not be obtained. Therefore, the heating temperature of the present invention is limited to the range of 300 to 400° C. 350° C.±30° C. is particular preferable.

Figure 3:
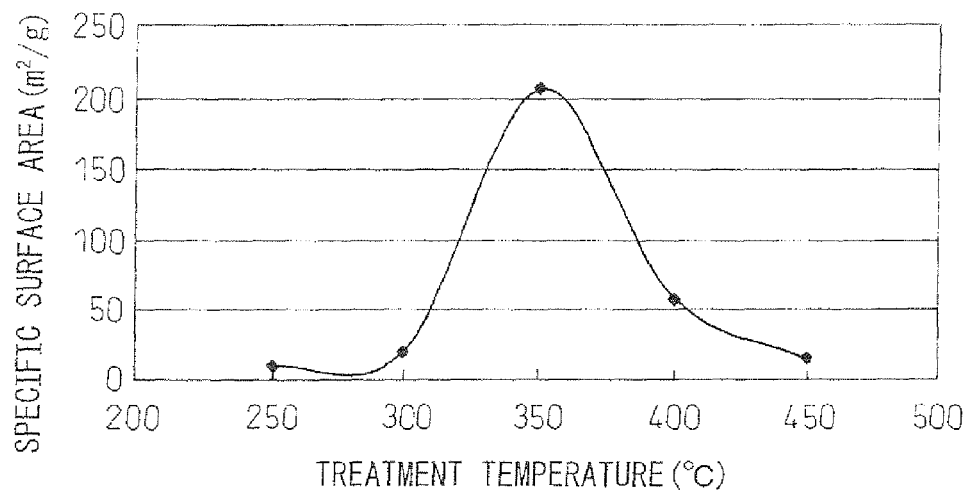
FIG. 3 shows a graph showing the relationship of the specific surface area and heating temperature of Ni nanoparticles generated by a heating temperature inside and outside the prescribed range of the present invention.

FIG. 3 shows the results in the case of using a mixed powder comprised of Ni-DMG plus alumina as shown in Example 2 as a starting material, but the relationship between the heating temperature and the specific surface area of the product was similar even in the case like in Example 1 of using only Ni-DMG no addition of alumina) as the starting material. However, the absolute value of the specific surface area is large when adding alumina, so the trend in the change with respect to the heating temperature becomes clearer, so the results in this case are shown as a typical example in FIG. 3.

<Comparison with Comparative Material>

Figure 4:
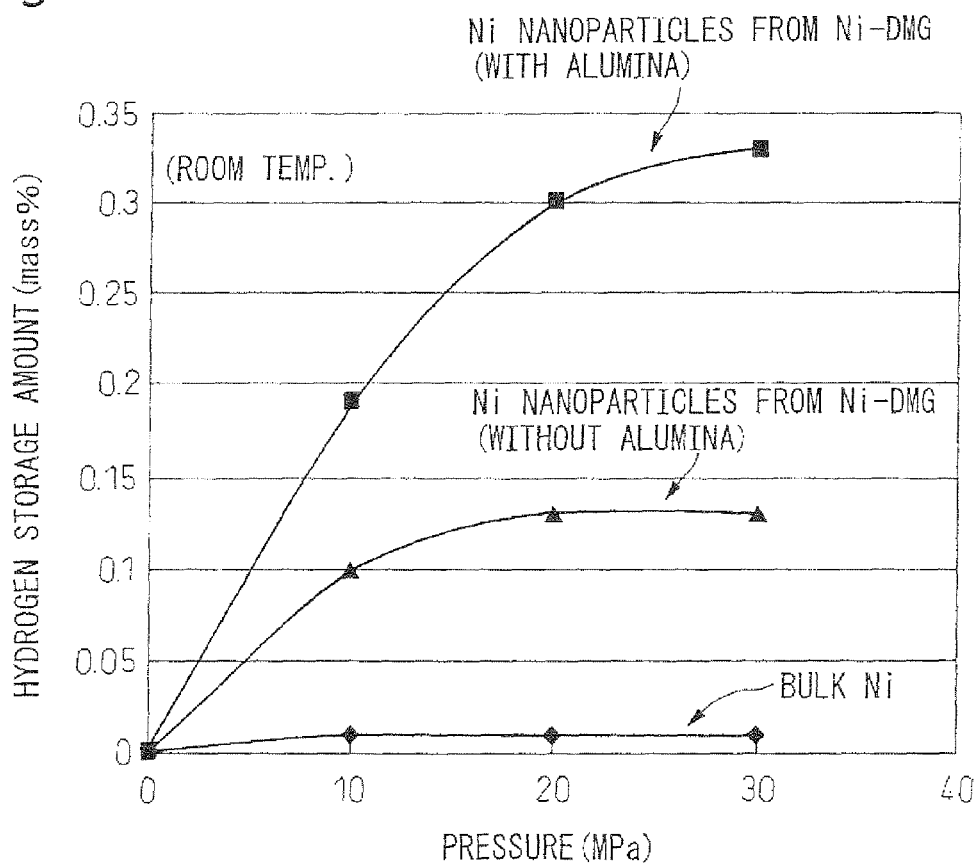
FIG. 4 shows a graph showing the relationship of the pressure and hydrogen storage amount at room temperature for Ni nanoparticles generated by the method of the present invention from Ni-DMG alone or an Ni-DMG/alumina mixture and a conventional bulk Ni.

The Ni nanoparticles obtained in Example 1 and Example 2 and the conventional bulk Ni particles (specific surface area of less than 1 $m^2/g$, particle size on order of μm) were measured for hydrogen storage amount at room temperature while changing the pressure in the range of 0 to 30 MPa (measurement method similar in Examples 1, 2). The results are shown together in FIG. 4.

As shown in the figure, with conventional bulk Ni particles, there was substantially no hydrogen storage (hydrogen storage amount about 0 ass %). As opposed to this, it was learned that the Ni nanoparticles generated from Example 1 (starting material: Ni-DMG alone) and Example 2 (starting material: Ni-DMG+alumina) of the present invention exhibits an extremely large hydrogen storage amount. In particular, the hydrogen storage amount was remarkably improved in the case of Example 2 (starting material: Ni-DMG+alumina).

In this way, according to the method of the present invention, it becomes possible to obtain a transition metal such as Ni alone as nanoparticles.

Further, by adding carrier particles like alumina, metal nanoparticles having a larger specific surface area can be obtained. The reasons are believed to be as follows.

Ni particles inherently become small in size. The following two points are considered as the reasons why the particles become smaller in size.

First, the size of metal particles at the time of generation may depend on the strength of the interaction between the carrier and metal. If the bonding force between alumina and Ni is greater than the bonding force between carbon and Ni, the restraining force on aggregation of Ni becomes larger, so the size of the secondary particles due to aggregation is probably kept small.

Second, it is deduced that the interaction between the carrier and Ni becomes stronger at the grain boundaries of the carrier. There is a possibility of the Ni particles preferentially aggregating at the carrier grain boundaries. If this model matches with the experimental data, it means that the amount of grain boundaries of carbon is greater than the amount of grain boundaries of alumina. The size of the primary particles is smaller in the case of alumina (2 to 4 nm) than carbon (several 10 s to 100 μm or so), but if observed by TEM after heat treatment, the alumina whiskers appear to be larger than the carbon. During heat treatment, the alumina whiskers aggregate and the effect of the grain boundaries is reduced.

While just a guess, the experimental fact that the specific surface area becomes larger and the hydrogen storage amount remarkably increases in the case of an alumina carrier as compared with a carbon carrier is either due to the above two mechanisms or due to other mechanisms. This is a matter for future study.

INDUSTRIAL APPLICABILITY

According to the present invention, there is provided a method of stably producing nanoparticles of a metal alone, in particular a transition metal alone.

The invention claimed is:

1. A method of production of transition metal nanoparticles, comprising:
heating a chelate complex comprised of two dimethyl glyoxime molecules and one transition metal ion at 320 to 380° C. so as to generate transition metal nanoparticles carried on carbon particles.

2. A method of production of transition metal nanoparticles as set forth in claim 1 wherein said transition metal is one of Ni, Cu, Pd, and Pt.

3. A method of production of transition metal nanoparticles as set forth in claim 1, wherein the generated transition metal nanoparticles have a size of a diameter of 5 to 15 nm.

4. A method of production of transition metal nanoparticles, comprising:
heating a mixture of a chelate complex comprised of two dimethyl glyoxime molecules and one transition metal ion and alumina at 320 to 380° C. so as to generate transition metal nanoparticles carried on the alumina.

5. A method of production of transition metal nanoparticles as set forth in claim 4, wherein said transition metal is one of Ni, Cu, Pd, and Pt.

6. A method of production of transition metal nanoparticles as set forth in claim 4, wherein the generated transition metal nanoparticles have a size of a diameter of 5 to 15 nm.

* * * * *